(12) United States Patent
Hwang

(10) Patent No.: US 7,562,007 B2
(45) Date of Patent: Jul. 14, 2009

(54) METHOD AND APPARATUS FOR RECOGNIZING LANGUAGE INPUT MODE AND METHOD AND APPARATUS FOR AUTOMATICALLY SWITCHING LANGUAGE INPUT MODES USING THE SAME

(75) Inventor: Kwang-ll Hwang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 799 days.

(21) Appl. No.: 10/867,791

(22) Filed: Jun. 16, 2004

(65) Prior Publication Data

US 2004/0260536 A1    Dec. 23, 2004

(30) Foreign Application Priority Data

Jun. 16, 2003    (KR) .................... 10-2003-0038679

(51) Int. Cl.
  *G06F 17/20*    (2006.01)
  *G06F 17/28*    (2006.01)
(52) U.S. Cl. ............................................. 704/8; 704/3
(58) Field of Classification Search ...................... None
  See application file for complete search history.

(56) References Cited

U.S. PATENT DOCUMENTS

| | | | | |
|---|---|---|---|---|
| 5,257,187 A | * | 10/1993 | Suzuki et al. | 704/3 |
| 5,634,134 A | * | 5/1997 | Kumai et al. | 715/536 |
| 5,966,637 A | * | 10/1999 | Kanungo et al. | 725/132 |
| 6,326,953 B1 | * | 12/2001 | Wana | 345/168 |
| 6,848,080 B1 | * | 1/2005 | Lee et al. | 715/533 |
| 7,080,002 B1 | * | 7/2006 | Kim | 704/2 |

(Continued)

FOREIGN PATENT DOCUMENTS

| KR | 10-165591 | 9/1998 |
|---|---|---|
| KR | 2001-103912 | 11/2001 |

OTHER PUBLICATIONS

Jisoon Nam, "Korean Electronic Dictionary", Korean Engineering Laboratory, Artificial Intelligence Research Center, Korean Advanced Institute of Science and Technology (KAIST).

(Continued)

*Primary Examiner*—David R Hudspeth
*Assistant Examiner*—Matthew J Sked
(74) *Attorney, Agent, or Firm*—Staas & Halsey LLP

(57) ABSTRACT

An apparatus for automatically switching language input modes including a first unit, to determine whether to turn on an automatic language input mode switching function; a second unit to bypass a current keystroke input via a predetermined input device when the control signal is an off signal, the second unit either bypasses the current keystroke or deletes previous keystrokes and converts the previous keystroke(s) and the current keystroke into their respective language counterparts according to recognizing a language input mode of a scan code of the current keystroke when the control signal is an on signal; and a third unit to recognize the language input mode of the scan code of the current keystroke by referring to language dictionaries and provide a current language input mode, the recognized language input mode of the current keystroke, keystroke deletion range information, and keystroke conversion range information to the second unit.

39 Claims, 7 Drawing Sheets

U.S. PATENT DOCUMENTS

| | | | |
|---|---|---|---|
| 7,139,697 B2* | 11/2006 | Hakkinen et al. | 704/9 |
| 7,155,671 B1* | 12/2006 | Kim et al. | 715/536 |
| 2002/0095288 A1* | 7/2002 | Sparre et al. | 704/256 |
| 2004/0177179 A1* | 9/2004 | Koivuniemi | 710/67 |

OTHER PUBLICATIONS

Notice to Submit Response issued by the Korean Intellectual Property Office on Sep. 29, 2005 in Application No. 10-2003-0038679 (8 pages total).

* cited by examiner

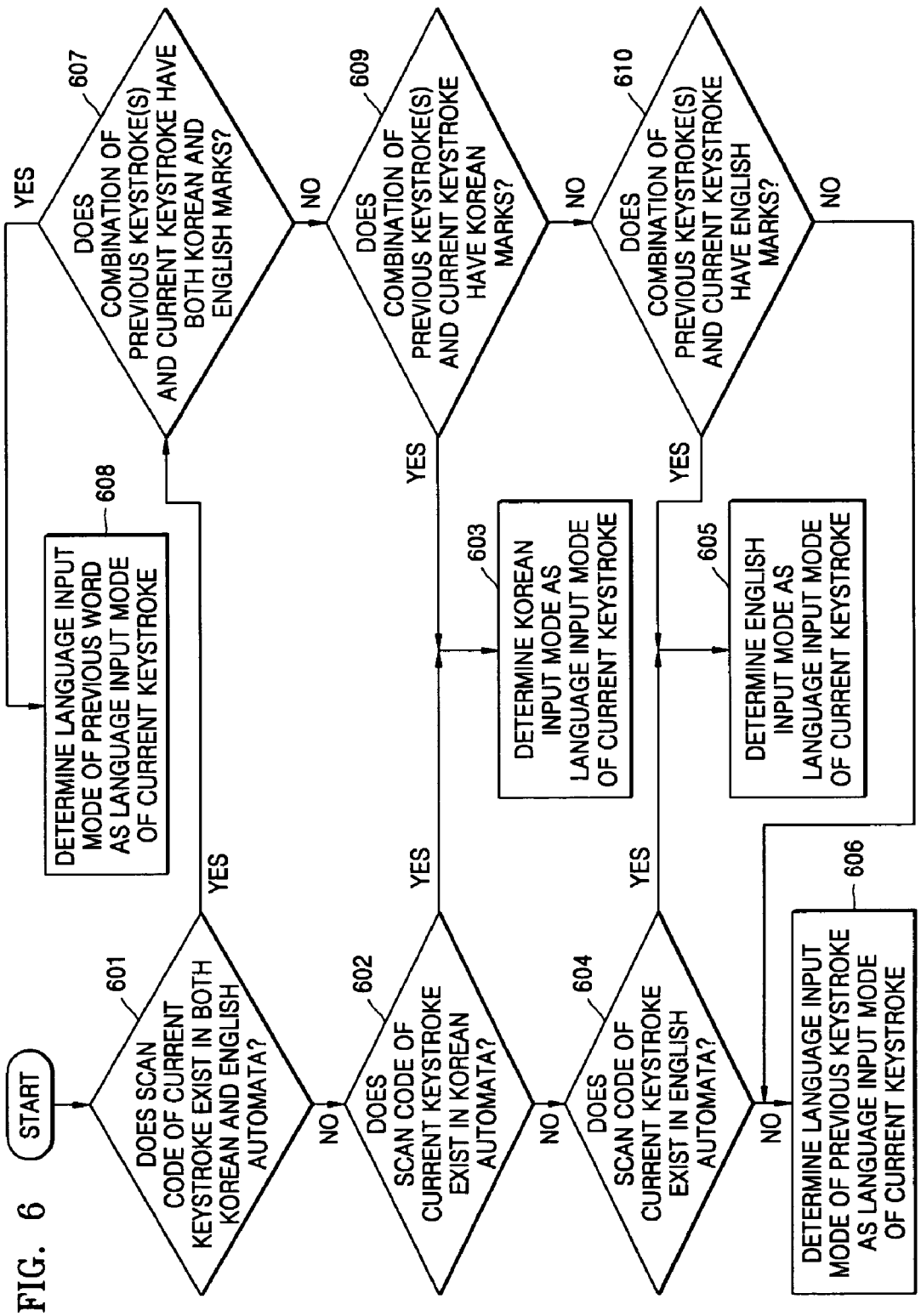

METHOD AND APPARATUS FOR RECOGNIZING LANGUAGE INPUT MODE AND METHOD AND APPARATUS FOR AUTOMATICALLY SWITCHING LANGUAGE INPUT MODES USING THE SAME

CROSS-REFERENCE TO RELATED APPLICATION

This application claims the benefit of Korean Patent Application No. 2003-38679, filed on Jun. 16, 2003 in the Korean Intellectual Property Office, the disclosure of which is incorporated herein in its entirety by reference.

BACKGROUND OF THE INVENTION

1. Field of the Invention

The present invention relates to a method and apparatus for recognizing at least two language input modes for keystrokes input to a device equipped with a keyboard or a keypad and a method and apparatus for automatically switching language input modes using the method and apparatus.

2. Description of the Related Art

When using an application program that supports both Korean and English input modes, a user is generally required to switch a current language input mode into either the Korean or the English input mode by using a Korean/English shift key disposed on a keyboard if the current language input mode is different from a language input mode the user desires. It is inconvenient for the user to press the Korean/English shift key whenever it is necessary to switch the current language input mode into either the Korean or English input mode.

In recent years, more people are accessing the Internet than ever before. In order to input an Internet domain address or a search keyword to an application program, such as a web browser program or a search engine, a user is required to type in Korean or English characters or both. In doing so, the user should check first whether a current language input mode is a Korean input mode or English input mode by using a keyboard and then press a Korean/English shift key disposed on the keyboard in order to switch the current language input mode into any desired one of the Korean and English input modes, if the current language input mode is different from the desired language input mode. If the user does not realize that the current language input mode is not the desired language input mode until a few language characters have already been typed, the user has to rewrite, in the desired language input mode, all of the language characters were already typed in, which is very inconvenient and time consuming.

For example, a user often types in an Internet domain address or a search keyword in a web browser program without determining whether the current language input mode is a Korean input mode or an English input mode, in which case the user is more likely to end up typing in the Internet domain address or the search keyword in a wrong language input mode. Therefore, for example, even though the user intends to type in "www.hangul.com", "ㅈㅈㅈ.ㅗ무혀l.채—" may show up on a screen if the current language input mode is the Korean input mode. In this case, the user has to delete all of the Korean characters that were accidentally typed in, shift the current language input mode into the English input mode, and type in the desired Internet domain address in the English input mode.

In order to solve the inconvenience of the related art that requires a user to manually switch language input modes between Korean and English input modes to keystroke in a different language input mode from a current language input mode while creating a document, a function of automatically switching the language input mode between the Korean and English input modes (hereinafter, referred to as conventional automatic language input mode switching function). The conventional automatic language input mode switching function has been recently added to many word processing programs and is provided by Hannsoft Inc., Samsung Electronics Co., Ltd., or Microsoft Inc. etc. By using the conventional automatic language input mode switching function, characters accidentally typed in the wrong language input mode can be automatically converted into their respective counterparts in a desired language input mode. In the conventional automatic language input mode switching function, however, the user is still required to hit a predetermined key, such as a spacebar or enter key, to convert the characters typed in the wrong language input mode into their respective counterparts in the desired language input mode. In addition, once the conventional automatic language input mode switching function is turned on, even characters typed in the desired language input mode may be indiscriminately converted into their respective counterparts in the wrong language input mode whenever the user presses the predetermined key, which is undesirable and inconvenient. Currently, the application of the conventional automatic language input mode switching function is restricted to such application programs as word processing programs, and the performance of the conventional automatic language input mode switching function is highly dependent on the capacity of an electronic dictionary provided for the corresponding function. Therefore, the effectiveness of the conventional automatic language input mode switching function is dependent on many external factors.

SUMMARY OF THE INVENTION

According to an aspect of the invention a method of recognizing, in real time, a language input mode of each keystroke input to a device equipped with an input device, such as a keyboard or a keypad.

According to an aspect of the invention a method of statistically recognizing a language input mode of each keystroke input to a device equipped with a keyboard or a keypad even when each keystroke contains an insertion error, a repetition error, or an omission error.

According to an aspect of the invention a method of recognizing a language input mode of each stroke input to a device equipped with a keyboard or a keypad is also provided, the method which enables a customizable recognition of a language input mode of vocabulary that is not registered with dictionaries as well as a language input mode of vocabulary registered with the dictionaries.

According to an aspect of the invention a method and apparatus for automatically switching at least two language input modes for a keystroke-based application program as well as a word processing program, based on a result of recognizing a language input mode of each keystroke, by expanding an operating system of a device equipped with a keyboard or a keypad is also provided. Here, the keystroke-based application program is an application program that needs keystrokes to operate in the device equipped with a keyboard or a keypad.

According to an aspect of the invention a method and apparatus for automatically switching at least two language input modes with high recognition rates without requiring a user to hit a predetermined key, such as a spacebar or an enter key during a keystroking process.

According to an aspect of the invention, a method and apparatus for automatically recognizing a language input mode of vocabulary that is not registered with dictionaries as well as a language input mode of vocabulary registered with the dictionaries and automatically switching at least two language input modes based on a result of recognizing a language input mode of each keystroke.

According to an aspect of the invention, there is provided a method of recognizing a language input mode, including determining whether a node for a scan code of a current keystroke exists in one of first and second input language automata and recognizing the language input mode of the scan code of the current keystroke; and determining whether the node for the scan code of the current keystroke has both a first input language 'completed' mark and a second input language 'completed' mark or both a first input language 'expected' mark and a second input language 'expected' mark, if the node for the scan code of the current keystroke is determined as existing in both of the first and second input language automata, and recognizing the language input mode of the scan code of the current keystroke.

According to another aspect of the invention, there is provided an apparatus for recognizing a language input mode, including a first input language electronic dictionary, with which recognition units of vocabulary of a first input language are registered; a second input language electronic dictionary, with which recognition units of vocabulary of a second input language are registered; a user language electronic dictionary, with which user vocabulary obtained from keystrokes that are manually deleted or converted by a user or combinations thereof is registered; and an adaptive recognizer, which recognizes a language input mode of a scan code of each keystroke by referring to the first and second input language electronic dictionaries and the user language electronic dictionary and provides a current language input mode, the recognized language input mode of the scan code of each keystroke, keystroke deletion range information, and keystroke conversion range information.

According to another aspect of the invention, there is provided a method of automatically switching language input modes, including generating a control signal that determines whether to turn on an automatic language input mode switching function; bypassing a current keystroke input via a predetermined input device if the control signal is an off signal; and bypassing the current keystroke, or deleting one or more previous keystrokes and converting the previous keystroke(s) and the current keystroke into their respective counterparts in another language input mode, depending on a result of recognizing a language input mode of a scan code of the current keystroke, if the control signal is an on signal.

According to another aspect of the invention, there is provided an apparatus for automatically switching language input modes, including: a first unit, which generates a control signal that determines whether to turn on an automatic language input mode switching function; a second unit, which bypasses a current keystroke input via a predetermined input device if the control signal is an off signal, the second unit either bypassing the current keystroke or deletes one or more previous keystrokes and converts the previous keystroke(s) and the current keystroke into their respective counterparts in another language input mode, depending on a result of recognizing a language input mode of a scan code of the current keystroke, if the control signal is an on signal; and a third unit, which recognizes the language input mode of the scan code of the current keystroke by referring to first and second input language electronic dictionaries and a user language electronic dictionary, and provides a current language input mode, the recognized language input mode of the current keystroke, keystroke deletion range information, and keystroke conversion range information to the second unit.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects and advantages of the present invention will become more apparent by describing in detail exemplary embodiments thereof with reference to the attached drawings in which:

FIG. 6 is a flowchart of the operation of an adaptive recognizer of FIG. 3.

DETAILED DESCRIPTION OF THE EMBODIMENTS

Figure 1:
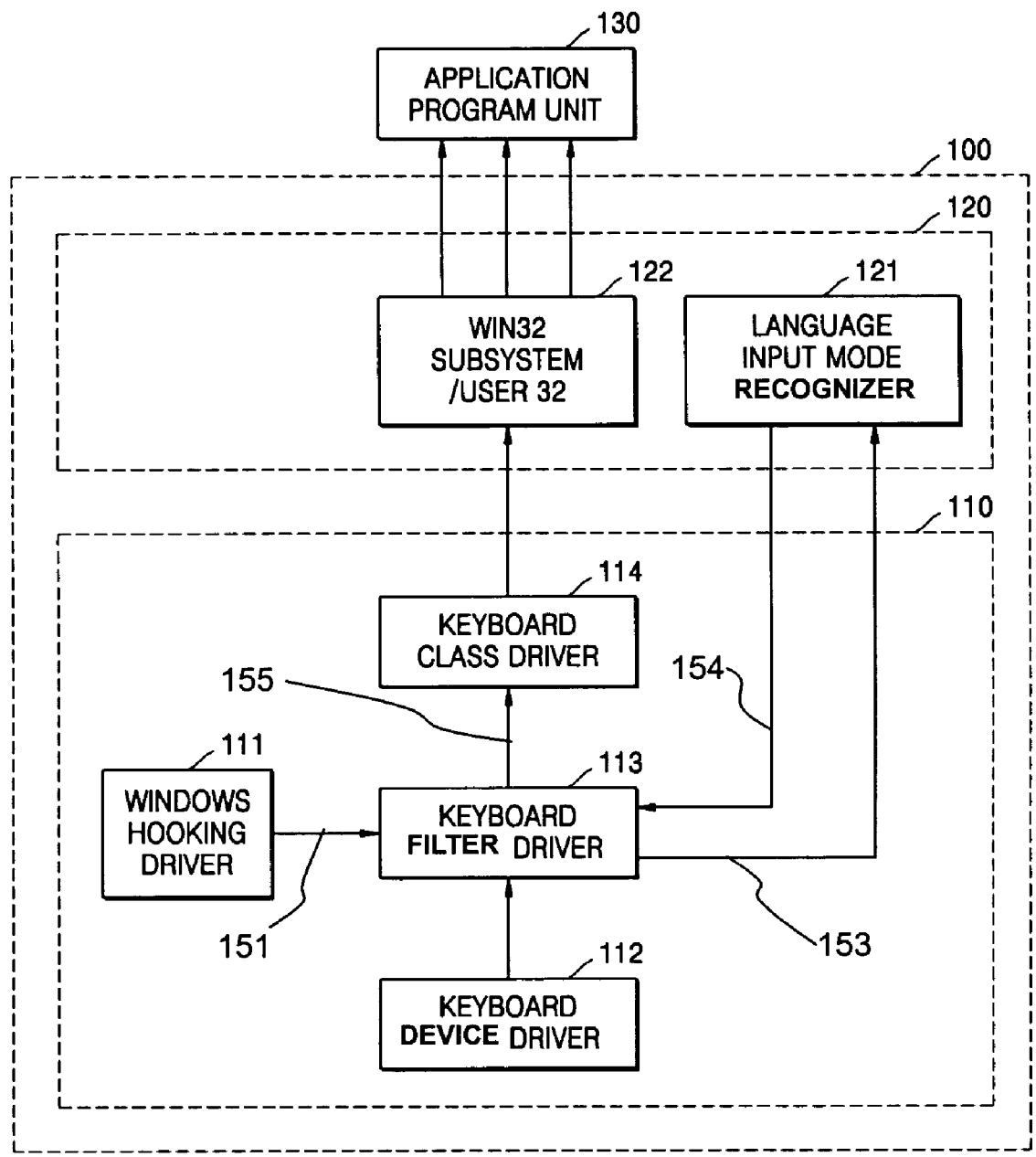
FIG. 1 is a block diagram of an apparatus for automatically switching language input modes according to an embodiment of the invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a block diagram of an apparatus for automatically switching language input modes according to an aspect of the invention. Referring to FIG. 1, the apparatus includes an operating system 100 and an application program unit 130. The operating system 100 includes a kernel module 110 that comprises a windows hooking driver 111, a keyboard device driver 112, a keyboard filter driver 113, and a keyboard class driver 114, and a user module 120 that comprises a language input mode recognizer 121 and a WIN32 subsystem/USER32 122. It is assumed here, by way of example, that the operating system 100 is Microsoft Windows, a keyboard is used as an input device (not shown), and first and second input languages are English and Korean, respectively. It is to be understood that other operating systems and other languages may be used.

The windows hooking driver 111 in the kernel module 110 manages and keeps track of all windows associated with threads of application program processes operating in shells of the operating system 100. In other words, the windows hooking driver 111 keeps checking which window among all the windows displayed on a screen a user is currently working on by using a component service provided by the kernel module 110 and the user module 120. The windows hooking driver 111 generates a prior control signal in response to a key signal input via a user interface or generates a posterior control signal depending on whether the window that the user is currently working on requires the automatic language input mode switching function. Here, the prior and posterior control signals allow the automatic language input mode switching function to be executed.

In order to easily determine which windows for application programs require the automatic language input mode switching function and which windows do not, all of the windows that can be created for all application programs registered with the apparatus for switching language input modes according to the aspect FIG. 1 are classified, in advance, into two different groups depending on whether their respective application programs need the automatic language input mode switching function or not. A list of application programs that do not need the automatic language input mode switching function may be set in the apparatus for switching language input modes according to the aspect of FIG. 1. Here, for example, the application programs that do not need the automatic language input mode switching function could be windows for just typing in an ID or password or windows for word processing programs or other application programs that have their own first input language/second language input mode shift function, i.e., an English/Korean language mode shift function.

The keyboard device driver 112 generates scan codes corresponding to keystrokes input from a keyboard in a first or second language input mode. The keyboard device driver 112 supports various types of interfaces, such as PS/2, USB, USB 2.0 and Serial.

The keyboard filter driver 113 operates in response to the prior or posterior control signal generated by the windows hooking driver 111. For example, if the prior or posterior control signal is an off signal that does not execute the automatic language input mode switching function, the keyboard filter driver 113 bypasses the scan codes of the first or second language input mode, received from the keyboard device driver 112, to the keyboard class driver 114. However, if the prior or posterior control signal is an on signal that executes the automatic language input mode switching function, the keyboard filter driver 113 bypasses the received scan codes of the first or second language input mode to the keyboard class driver 114. In addition, the keyboard filter driver 113 also creates scan codes that delete keystrokes that fall within a first range or scan codes that convert keystrokes that fall within a second range into their respective counterparts in another language input mode and provide the scan codes to the keyboard class driver 114, depending on a result of recognizing a current language input mode provided by the language input mode 121 for each keystroke. Here, the first range indicates a range of keystrokes to be deleted (referred to as keystroke deletion range). More specifically, where there are one or more previous keystrokes combined with a current keystroke and a current language input mode is different from a recognized language input mode of the current keystroke, the keystroke deletion range is defined as the number of previous keystrokes combined with the current keystroke. The second range indicates a range of keystrokes to be converted into their counterparts in another language input mode (hereinafter, referred to as keystroke conversion range). The keystroke conversion range is greater than the keystroke deletion range by 1 keystroke so that the current keystroke can fall within the keystroke conversion range.

The keyboard class driver 114, which provides an interface to, for example, the WIN 32 subsystem/USER32 122, converts the scan codes received from the keyboard filter driver 113 into key codes and provides the key codes to the WIN32 subsystem/USER32 122.

In the user module 120, the language input mode recognizer 121 receives the scan codes of the first or second language input mode from the keyboard device driver 112, and recognizes a language input mode of a scan code of each morpheme-like language unit of each keystroke. The language input mode recognizer 121 then determines starting and ending keystrokes of each of the keystroke deletion and keystroke conversion ranges in accordance with the difference between the current language input mode and the recognized language input mode, and provides information on the starting and ending keystrokes of each of the keystroke deletion and keystroke conversion ranges to the keyboard filter driver 113. The WIN32 subsystem/USER32 122 manages various application programs of the application program unit 130.

The application program unit 130 includes at least one keystroke-based application program, such as DOS, a word processing program (e.g., MS Word or Hangul), a web browser (e.g., Internet Explorer), game software using Direct X, a messenger program, or a notepad program. The application program unit 130 does not include such application programs as those for typing in an ID or password that do not need the automatic language input mode switching function. Even though there are application programs, such as Internet Explorer, that are already included in the operating system 100, it is assumed here for the convenience of explanation the application program unit 130 is separate from the operating system 100. However, it is understood that the language input mode recognizer 121 can be included with the program unit 130, and that the language input mode recognizer 121 can be located elsewhere in the system.

For application of the invention to operating systems other than MICROSOFT WINDOWS, FIG. 1 illustrates that the language input mode recognizer 121 is included in the user module 120. The language input mode recognizer 121, however, may be included in the kernel module 110 together with the keyboard filter driver 113.

The operation of the apparatus for automatically switching language input modes will now be described in greater detail with reference to FIG. 1. The apparatus for automatically switching language input modes according to the aspect of FIG. 1 is characterized by its independence of the operation of the operating system 100. The keyboard filter driver 113 bypasses a scan code, generated for each keystroke by the keyboard device driver 112 along path 152, to the keyboard class driver 114 along path 155 if the prior control signal is an off signal or if the prior control signal is an on signal and the posterior control signal is an off signal along the path 151.

If both the prior control signal and the posterior control signal are on signals along the path 151 from the widows hooking driver 111, the keyboard filter driver 113 provides the scan code, generated for each keystroke by the keyboard device driver 112 along the path 152, to the language input mode recognizer 121 along the path 153. The keyboard filter driver 113 may perform a process of bypassing a current keystroke, converting the current keystroke into its counterpart in another language input mode, deleting a previous keystroke, or converting the current keystroke and the previous keystroke language into their counterparts in another language input mode, depending on the language input mode recognition result and the keystroke deletion and keystroke conversion ranges provided by the language input mode recognizer 121 along the path 154, and provides the performance result to the keyboard class driver 114 along the path 155.

Figure 2:
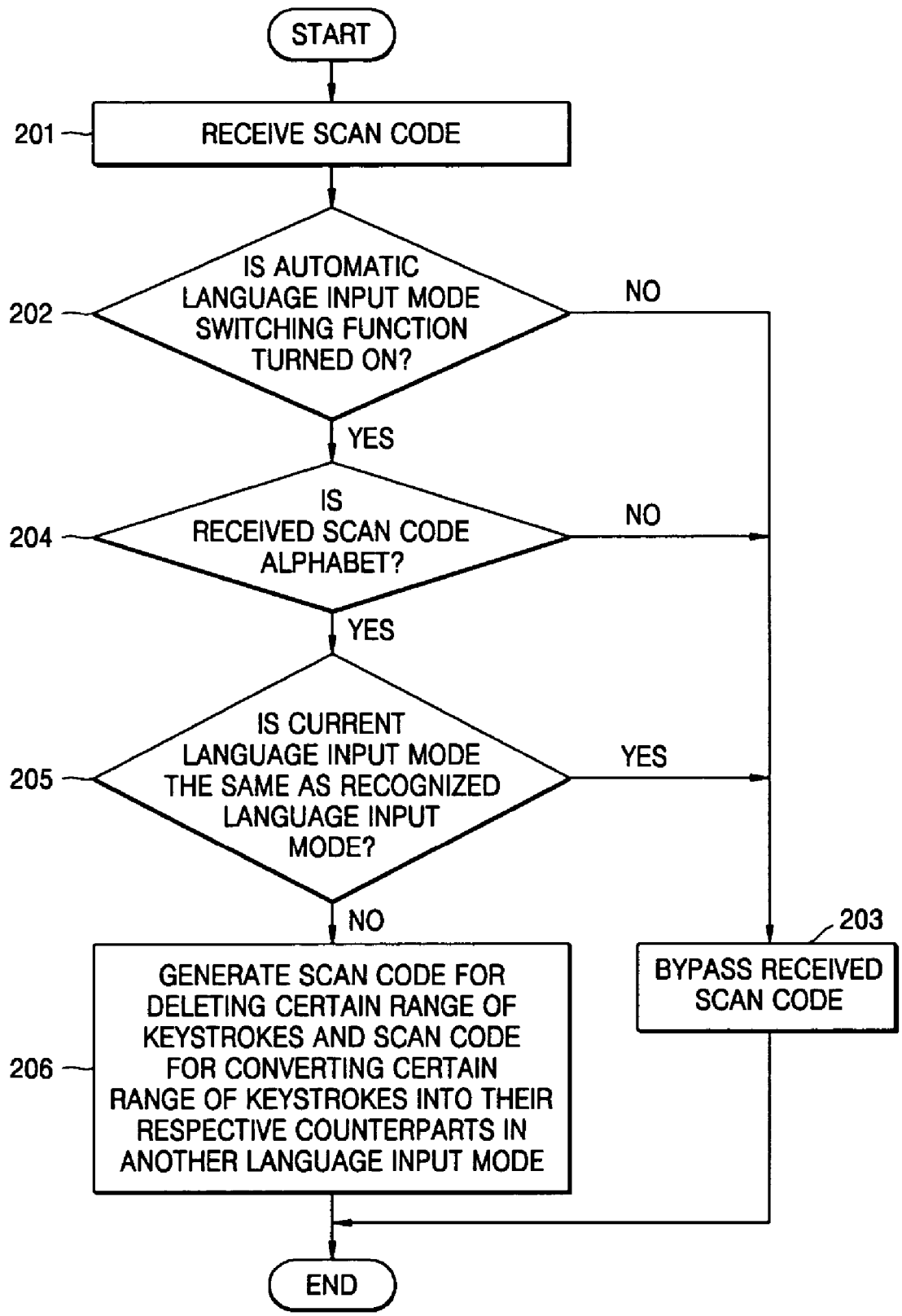
FIG. 2 is a flowchart of the operation of a keyboard filter driver of FIG. 1.

FIG. 2 is a flowchart of the operation of the keyboard filter driver 113 of FIG. 1. Referring to FIG. 2, a scan code for each keystroke is received from the keyboard device driver 112 in operation 201.

In operation 202, it is determined whether an automatic language input mode switching function is turned on by monitoring a prior control signal and a posterior control signal provided by the windows hooking driver 111. If the automatic language input mode switching function is turned off, the received scan code is bypassed to the keyboard class driver 114 in operation 203.

If the automatic language input mode switching function is turned on, it is determined whether the received scan code corresponds to the Korean or English alphabet that includes vowels and consonants in operation 204. If the received scan code does not correspond to the Korean or English alphabet, i.e., if the received scan code corresponds to a number or a sign, the received scan code is bypassed to the keyboard class driver 114.

If the received scan code corresponds to the Korean or English alphabet, it is determined whether a current language input mode is the same as a language input mode determined by the recognition result of the language input mode for each keystroke in operation 205. If the current language input mode is the same as the recognized language input mode of each keystroke, the received scan code is bypassed to the keyboard class driver 114.

Unless the current language input mode is the same as the recognized language input mode of each keystroke, a process of bypassing a current keystroke, converting the current keystroke into its counterpart in another language input mode, deleting at least one previous keystroke, and/or converting the current keystroke and the previous keystroke into their respective counterparts in another language input mode is performed. Such performance depends on information relating to the keystroke deletion and keystroke conversion ranges provided by the language input mode recognizer 121, and the performance result is provided to the keyboard class driver 114, in operation 206.

Figure 3:
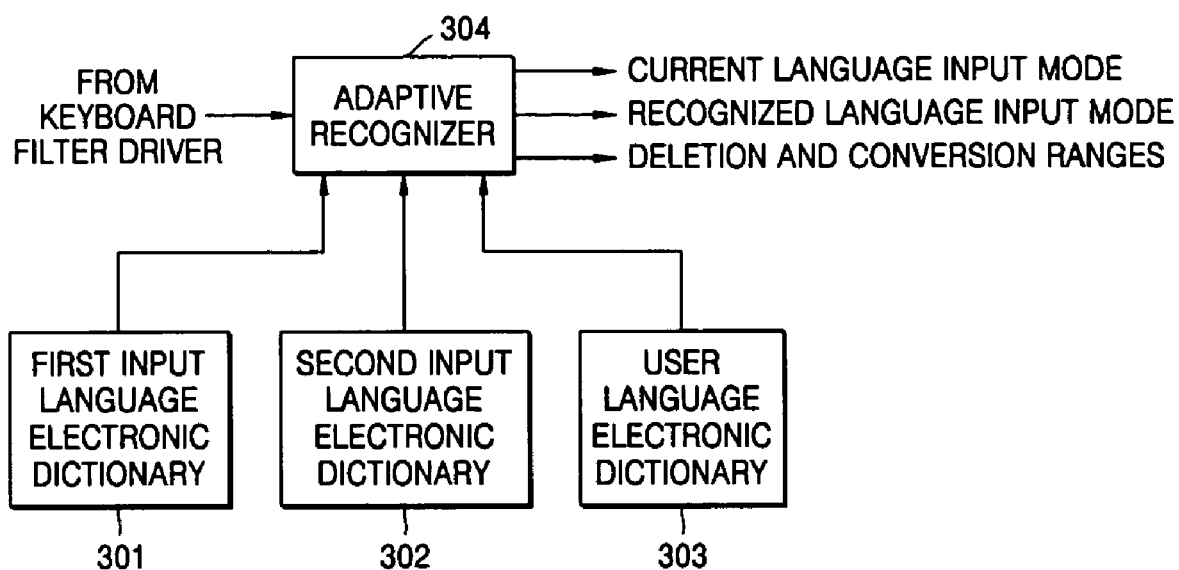
FIG. 3 is a detailed block diagram of a language input mode recognizer of FIG. 1.

FIG. 3 is a detailed block diagram of the language input mode recognizer 121 of FIG. 1. Referring to FIG. 3, the language input mode recognizer 121 includes at least first and second input language electronic dictionaries 301 and 302, a user language electronic dictionary 303, and an adaptive recognizer 304. Since the user language electronic dictionary 303 includes some of the same vocabulary found in the first and second input languages, it may be integrated into the first and second input language electronic dictionaries 301 and 302.

Various vocabulary words that are highly likely to be input by a user are registered with each of the first and second input language electronic dictionaries 301 and 302 on a morpheme-like unit basis, together with additional information. Here, a morpheme-like unit could be a morpheme or a word. Specifically, the various vocabularies are registered with each of the first and second input language electronic dictionaries 301 and 302 in a vocabulary decision tree structure in order to reduce the storage capacity of a memory occupied by the various vocabulary words and increase the speed of recognizing each of the various vocabulary words. The vocabulary decision tree structure is obtained by using finite state automata.

The adaptive recognizer 304 monitors which vocabulary words are repeatedly deleted after being automatically converted into their respective counterparts in a language input mode other than their original language input mode and are restored to what they used to be and registers the corresponding vocabulary words with the user language electronic dictionary 303. The vocabulary words, like those registered with each of the first and second input language electronic dictionaries 301 and 302, are registered with the user language electronic dictionary 303 in a vocabulary decision tree structure, which is obtained by using finite-state automata. For example, newly-coined words, such as chat words, abbreviated words, technical words, or other new vocabulary words that are yet to be registered with each of the first and second input language electronic dictionaries 301 and 302 can be additionally registered with the user language electronic dictionary 303, thereby increasing a recognition rate of the apparatus for automatically switching language input modes. Such additional words can be added directly by the user, or may be updated by updates provided from a manufacturer or other source.

The adaptive recognizer 304 adaptively recognizes a language input mode of a current keystroke received from the keyboard filter driver 113 or a combination of at least one previous keystroke and the current keystroke by referring to the first and second input language electronic dictionaries 301 and 302 and the user language electronic dictionary 303. Thereafter, the adaptive recognizer 304 provides a current language input mode, the recognized language input mode of the current keystroke, and information on keystroke deletion and keystroke conversion ranges to the keyboard filter driver 113.

Figure 4A:
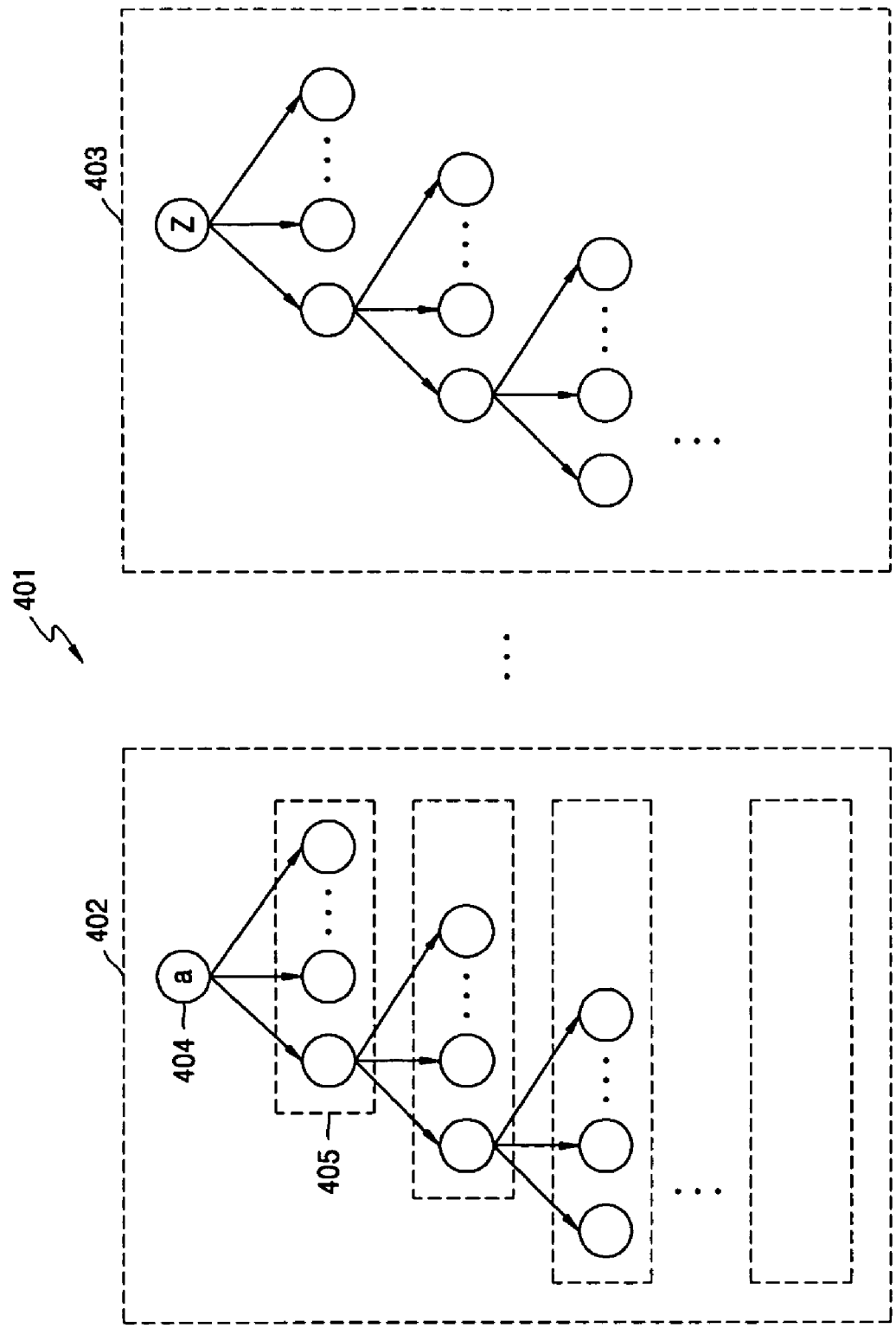
FIGS. 4A and 4B are diagrams showing automata structures of first and second input language electronic dictionaries and a user language electronic dictionary of FIG. 3.
Figure 4B:
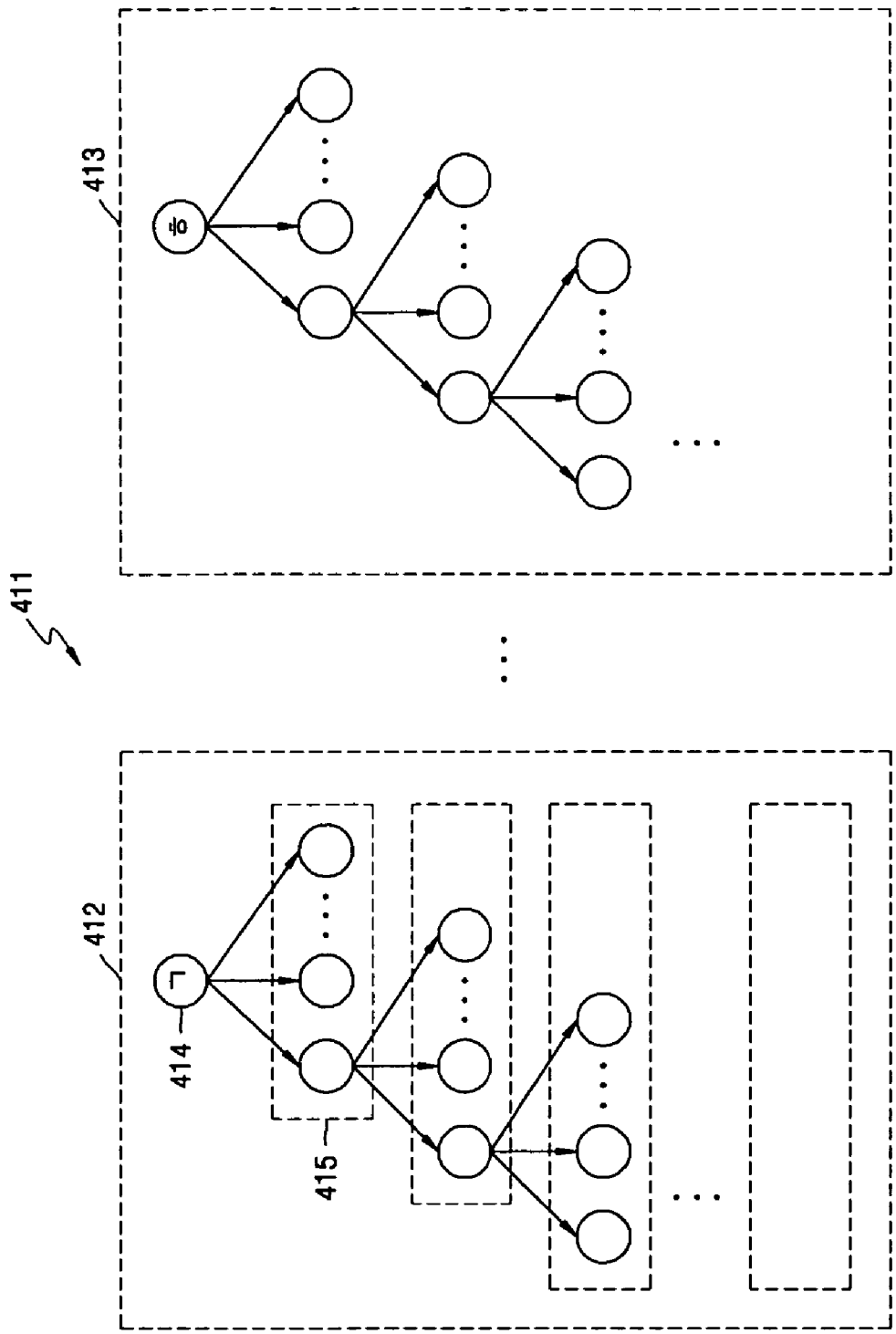

FIGS. 4A and 4B are diagrams showing automata structures of the first and second input language electronic dictionaries 301 and 302 and the user language electronic dictionary 303 of FIG. 3. More specifically, FIG. 4A illustrates a vocabulary decision tree of the first input language (i.e., English), and FIG. 4B illustrates a vocabulary decision tree of the second input language (i.e., Korean).

Referring to FIG. 4A, an English automata structure comprises a super-tree 401 that comprises k sub-trees 402 and 403. The number k of sub-trees that can be branched out from the super-tree 401 is the same as the number of base nodes 404 of the sub-trees 402 and 403. For example, in the English automata structure, a total of 52 data, including 26 small letters and 26 capital letters, are input to the base nodes 404, and, accordingly, the number k of sub-trees 402 and 403 is limited to 52. Each of the base nodes 404 may have up to 52 daughter nodes 405 (i.e., 52 sub-nodes), which applies to the rest of each of the sub-trees 402 and 403. In a case where the depth of an uppermost node of each of the sub-trees 402 and 403, i.e., the depth of each of the base nodes 404, is set to level 0, a maximum depth (or maximum level) of each of the sub-trees 402 and 403 is determined based on a vocabulary word having a largest length among all of English training data for use in establishing the English automata structure.

Referring to FIG. 4B, a Korean automata structure, like the English automata structure of FIG. 4A, comprises a super-tree 411 that comprises m sub-trees 412 and 413. The number m of sub-trees 412 and 413 that can be branched out from the super-tree 411 is the same as the number of base nodes of the sub-trees 412 and 413. In the Korean automata structure, a total of 19 data, including 14 single consonants and 5 double consonants, are input to the base nodes 414, and accordingly, the number m of sub-trees 412 and 413 is limited to 19. The base node 414 may have as many daughter nodes 415 (or sub-nodes) as the number of combinations of Korean initial sounds, vowels or semivowels, and final consonants that are allowable under Korean grammar, which applies to the rest of each of the sub-trees 412 and 413. In a case where the depth of an uppermost node of each of the sub-trees 412 and 413, i.e., the depth of each of the base nodes 414, is set to level 0, a maximum depth (or maximum level) of each of the sub-trees 412 and 413 is determined based on a vocabulary word having a largest length among all of Korean training data for use in establishing the Korean automata structure.

In short, the depth and size of the English automata structure is variably determined based on the English training data for use in establishing the English automata structure, and the depth and size of the Korean automata structure is also dynamically determined based on the Korean training data for use in establishing the Korean automata structure.

In the meantime, supposing that i represents an index of each node of an English automata structure, and j represents the depth of each node of the English automata structure, a set $A_{ij}$ of input data that each node of the English automata structure may have can be expressed by Equation (1) below:

$$A_{ij} = \{a, b, \ldots, z, A, B, \ldots, Z\}, i=0, 1, \ldots, 51, j=0, 1, \ldots, j_{max}-1 \quad (1)$$

where $j_{max}$ represents the number of keystrokes of a vocabulary word having a largest length among the English training data for use in establishing the English automata structure.

Figure 5:
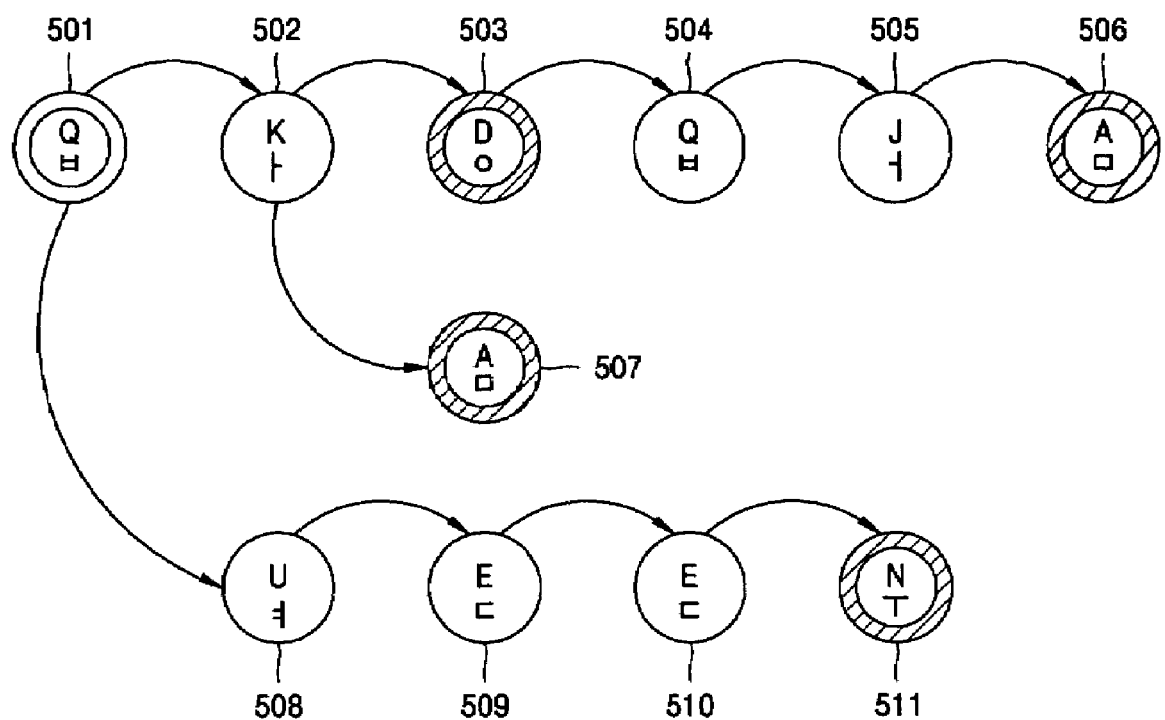
FIG. 5 is a diagram illustrating a process of recognizing a language input mode using the automata structures of FIGS. 4A and 4B.

FIG. 5 is a diagram illustrating a process of recognizing a language input mode using the automata structures of FIGS. 4A and 4B. Referring to FIG. 5, in a case where the first, second, and third keystrokes of a predetermined morpheme-like unit are Q (ㅂ), K (ㅏ), and D (ㅇ), respectively, a Korean syllable '방' is obtained at a node 503 as a result of combining the first through third keystrokes of the predetermined morpheme-like unit, which are selected from a node 501, a node 502, and the node 503, respectively. Consequently, a Korean 'completed' mark is put on the node 503 since '방' is complete as a Korean morpheme-like unit. Here, the node 501 is a base node.

In a case where the first through sixth keystrokes of another predetermined morpheme-like unit are Q (ㅂ), K (ㅏ), D (ㅇ), Q (ㅂ), J (ㅓ), and A (ㅁ), respectively, a combination of two Korean syllables '방범' is obtained at a node 506 as a result of combining the first through sixth keystrokes of the predetermined morpheme-like unit, which are selected from the base node 501, the node 502, the node 503, a node 504, a node 505, and the node 506, respectively, and the Korean 'completed' mark is put on the node 506 since '방범' is complete as a Korean morpheme-like unit.

In a case where the first through third keystrokes of another predetermined morpheme-like unit are Q (ㅂ), K (ㅏ), and A (ㅁ), respectively, a Korean syllable '밤' is obtained at a node 507 as a result of combining the first through third keystrokes of the predetermined morpheme-like unit, which are selected from the base node 501, the node 502, and the node 507, respectively, and the Korean 'completed' mark is put on the node 507 since '밤' is complete as a Korean morpheme-like unit.

In a case where the first through fifth keystrokes of another predetermined morpheme-like unit are Q (ㅂ), U (ㅕ), E (ㄷ), E (ㄷ), and N (ㅜ), respectively, an English word 'QUEEN' is obtained at a node 511 as a result of combining the first through fifth keystrokes of the predetermined morpheme-like unit, which are selected from nodes 501 and 508 through 511, respectively, and an English 'completed' mark is put on the node 511 since 'QUEEN' is complete as an English morpheme-like unit.

FIG. 6 is a flowchart of the operation of the adaptive recognizer 304 of FIG. 3. The operation illustrated in FIG. 6 is performed for each keystroke of each recognition unit. For the convenience of explanation, it is assumed that first and second input language automata for a user language registered with the user language electronic dictionary 303 are simply added to the first and second input language electronic dictionaries 301 and 302.

In addition, at least 'stayed', 'expected', and completed' marks are used as state marks. A 'stayed' state defines a circumstance where no node exists in Korean and English automata for a scan code of a current keystroke. This may even encompass well-known typos occurring during a keystroking process due to an insertion, omission, or repetition error. An 'expected' state defines a circumstance where a node for the scan code of the current keystroke exists in the Korean or English automata, and it is possible to statistically estimate which language, English or Korean, a combination of previous keystroke(s) and the current keystroke, for example, a syllable (or syllables), belongs. A 'completed' state defines a circumstance where the combination of the previous keystroke(s) and the current keystroke exists in the Korean or English automata and can be precisely determined as Korean or English. Information on each of the above-described states is added to the automata structures of the first and second input language electronic dictionaries 301 and 302 and the user language electronic dictionary 303.

Referring to FIG. 6, it is determined whether a node for a scan code of a current keystroke received from the keyboard filter driver 113 exists in both Korean and English automata in operation 601. If the node for the scan code of the current keystroke does not exist in both of the Korean and English automata, it is determined whether the node for the scan code of the current keystroke exists in the Korean automata in operation 602. If the node for the scan code of the current keystroke exists in the Korean automata, it is determined that a language input mode of the current keystroke is a Korean input mode in operation 603. It is understood that the order of language-type to be determined in operation 602 may be reversed, for example, it may be first determined whether the node for the scan code of the current keystroke exists in the English automata.

If the node for the scan code of the current keystroke does not exist in the Korean automata in operation 602, it is determined whether the node for the scan code of the current keystroke exists in the English automata in operation 604. If the node for the scan code of the current keystroke exists in the English automata, it is determined that the scan code of the current keystroke corresponds to an English input mode in operation 605. Otherwise, a language input mode of the previous keystroke(s) is determined as the language input mode of the current keystroke in operation 606. Here, the occasion when the language input mode of the previous keystroke(s) is determined as the language input mode of the current keystroke is defined as the 'stayed' state because the node for the scan code of the current keystroke does not exist in the Korean and English automata.

If the node for the scan code of the current keystroke exists in both of the Korean and English automata in operation 601, it is determined whether the combination of the previous keystroke(s) and the current keystroke has both Korean 'completed' and English 'completed' marks or both 'Korean expected' and 'English expected' marks, i.e., whether the combination of the previous keystroke(s) and the current keystroke is complete as both Korean and English morpheme-like units, in operation 607. If the combination of the previous keystroke(s) and the current keystroke has both of the Korean 'completed' and English 'completed' marks or the 'Korean expected' and 'English expected' marks in operation 607, the language input mode of the previous keystroke(s) is determined as the language input mode of the current keystroke in operation 608 because, statistically, it is more likely for a user to keep keystroking in a single language input mode than to keystroke while changing language input modes.

If the combination of the previous keystroke(s) and the current keystroke does not have both of the Korean 'completed' and English 'completed' marks or both of the 'Korean expected' and 'English expected' marks in operation 607, it is determined whether the combination of the previous keystroke(s) and the current keystroke has the Korean 'completed' mark or the 'Korean expected' mark in operation 609. If the combination of the previous keystroke(s) and the current keystroke has the Korean 'completed' mark or the 'Korean expected' mark, it is determined in operation 603 that the language input mode of the current keystroke is a Korean input mode. Again, it is understood that the order of language-type to be determined in operation 609 may be reversed, for example, it may be first determined whether the node for the scan code of the current keystroke exists in the English automata.

If the combination of the previous keystroke(s) and the current keystroke does not have both of the Korean 'completed' and 'Korean expected' marks or both of the English 'completed' and the 'English expected' marks in operation 607, it is determined whether the combination of the previous keystroke(s) and the current keystroke has the 'English complete' mark or the 'English expected' mark in operation 610. If the combination of the previous keystroke(s) and the current keystroke has the English 'completed' mark or the 'English expected' mark, it is determined in operation 605 that the language input mode of the current keystroke is an English input mode. Unless the combination of the previous keystroke(s) and the current keystroke has the English 'completed' mark or the 'English expected' mark, the operation returns to operation 606 such that the language input mode of the previous keystroke(s) is determined as the language input mode of the current keystroke.

If a current language input mode is different from the language input mode of the current keystroke determined in any of operations 603, 605, 606, and 608, a keystroke deletion range for deleting the previous keystroke(s) that have affected the determination of the language input mode of the current keystroke and a keystroke conversion range for converting the language input mode(s) of the current stroke and the previous keystroke(s) into another language input mode are set together with the current language input mode and the determined language input mode of the current keystroke.

Table 1 below shows sequential steps of the operation of the language input mode recognizer 121 of FIG. 1 in a case where a vocabulary word that is desired to be keystroked is a combination of four Korean syllables and an English letter a, i.e., '황광일a는'. Here, it is assumed that English letters a, g, d, h, r, and l and Korean single-syllable words 호, 황, 고, 과, 광, 이, and 일 each have an 'expected' mark, and 'as' and 'asm' each have an English 'completed' mark. The operation of the language input mode recognizer 121 of FIG. 1 will now be described more fully with reference to FIGS. 1 and 6 and Table 1.

TABLE 1

| Serial Number | Keystroke | Current Language Input Mode | Recognized Language Input Mode | Deletion Range | Conversion Range | Displayed Keystroke |
|---|---|---|---|---|---|---|
| 1 | ㅎ | Korean | English | 0 | 1(ㅎ) | g |
| 2 | h | English | Korean | 1(g) | 2(gh) | 호 |
| 3 | ㅏ | Korean | Korean | 0 | 0 | 하 |
| 4 | ㅇ | Korean | Korean | 0 | 0 | 황 |
| 5 | ㄱ | Korean | English | 0 | 1(ㄱ) | 황r |
| 6 | h | English | Korean | 1(r) | 2(rh) | 황고 |
| 7 | ㅏ | Korean | Korean | 0 | 0 | 황과 |
| 8 | ㅇ | Korean | Korean | 0 | 0 | 황광 |
| 9 | ㅇ | Korean | English | 0 | 1(ㅇ) | 황광d |
| 10 | l | English | Korean | 1(d) | 2(dl) | 황광이 |
| 11 | ㄹ | Korean | Korean | 0 | 0 | 황광일 |
| 12 | ㅁ | Korean | English | 0 | 1(ㅁ) | 황광일a |
| 13 | s | English | English | 0 | 0 | 황광일as |
| 14 | m | English | English | 0 | 0 | 황광일asm |
| 15 | s | English | Korean | 2(sm) | 3(sms) | 황광일a는 |

Referring to Table 1, 'ㅎ(g)' is input as a first keystroke. Then, in operation 601, it is determined that a node for a scan code of the first keystroke 'ㅎ(g)' exists in both of the Korean and English automata as a base node. Since the node for the scan code of the twelfth keystroke 'ㅁ(a)' exists in both of the Korean and English automata, it is determined in operation 607 whether the first keystroke 'ㅎ(g)' has both of the Korean 'completed' and 'complete English marks or both of the 'Korean expected' and 'English expected' marks. Since 'g' has the 'English expected' mark, the first keystroke 'ㅎ(g)' is perceived as 'g' in operation 610, and keystroke deletion range information and keystroke conversion range information, which are set to 0 and 1, respectively, are provided to the keyboard filter driver 113. Thereafter, the keyboard filter driver 113 converts 'ㅎ' into 'g', provides 'g' to the keyboard class driver 114, and converts a current language input mode into an English input mode.

Thereafter, 'h(ㅗ)' is input as a second keystroke. Then, in operation 601, it is determined that a node for a scan code of the second keystroke 'h(ㅗ)' exists in both of the Korean and English automata. Since the node for the scan code of the second keystroke 'h(ㅗ)' exists in both of the Korean and English automata and the combination of the previous keystroke and the current keystroke 'ㅎ' has an expected mark, the Korean input mode is determined as a language input mode of a combination of the first and second keystrokes 'ㅎh(ㅗ)' in operations 607 through 609. Thereafter, the keystroke deletion range information and the keystroke conversion range information, which are set to 1 and 2, respectively, are provided to the keyboard filter driver 113 because the current language input mode is an English input mode but the perceived language input mode is the Korean input mode. Then, the keyboard filter driver 113 provides a scan code for deleting the first keystroke 'g' and a scan code for converting the combination of the first and second keystrokes 'gh' into 'ㅎ' to the keyboard class driver 114 and converts the current language input mode into the Korean input mode. Likewise, language input modes of third through eleventh keystrokes are sequentially recognized. As a result, '횡광일' is displayed. The processes of recognizing the language input modes of the third through eleventh keystrokes is identical to the processes discussed above with regard to the first and second keystrokes, therefore a detailed description of such processes is not necessary.

Thereafter, 'ㅁ(a)' is input as a twelfth keystroke. Then, in operation 601, it is determined whether a node for a scan code of the twelfth keystroke 'ㅁ(a)' exists in both of the Korean and English automata. Since the node for the scan code of the twelfth keystroke 'ㅁ(a)' only exists in the English automata, it is determined whether the twelfth keystroke 'ㅁ(a)' has both of the 'Korean complete' and 'English complete' marks or both of the 'Korean expected' and 'English expected' marks in operation 607. Since 'a' has an expected mark, the twelfth keystroke 'ㅁ(a)' is perceived as 'a' in operation 610, and the keystroke deletion range information and the keystroke conversion range information, which are set to 0 and 1, respectively, are provided to the keyboard filter driver 113. Then, the keyboard filter driver 113 converts 'ㅁ' into 'a', provides 'a' to the keyboard class driver 114, and converts the current language input mode into the English input mode.

Thereafter, 's(ㄴ)' is input as a thirteenth keystroke. Then, in operation 601, it is determined whether a combination of the twelfth and thirteenth keystrokes 'as(ㅁㄴ)' exists in both of the Korean and English automata. Since the node for the scan code of the combination of the twelfth and thirteenth keystrokes 'as(ㅁㄴ)' only exists in the English automata, the English input mode is determined as a language input mode of the thirteenth keystroke 's(ㄴ)' in operations 604 and 604. Since the current language input mode and the language input mode of the thirteenth keystroke 's(ㄴ)' are all in the English input mode, the keystroke deletion range information and the keystroke conversion range are all set to 0. Thereafter, the keystroke deletion range information and the keystroke conversion range are provided to the keyboard filter driver 113 together with the current language input mode and the language input mode of the thirteenth keystroke 's(ㄴ)'. Then, the keyboard filter driver 113 bypasses the thirteenth keystroke 's' to the keyboard class driver 114 and maintains the English input mode as the current language input mode.

Thereafter, 'm(ㅡ)' is input as a fourteenth keystroke. Then, in operation 601, it is determined whether a node for a scan code of a combination of the twelfth through fourteenth keystroke 'asm(ㅁㄴㅡ)' exists in both of the Korea and English automata. Since the node for the scan code of 'asm(ㅁㄴㅡ)' only exists in the English automata, the English input mode is determined as a language input mode of the fourteenth keystroke 'm(ㅡ)' in operations 604 and 605. Since the current language input mode and the language input mode of the fourteenth keystrokes 'm(ㅡ)' are all the English input mode, the keystroke deletion range information and the keystroke conversion range are all set to 0. Thereafter, the keystroke deletion range information and the keystroke conversion range are provided to the keyboard filter driver 113 together with the current language input mode and the language input mode of the fourteenth keystroke 'm(ㅡ)'. Then, the keyboard filter driver 113 bypasses the fourteenth keystroke 'm(ㅡ)' to the keyboard class driver 114 and maintains the English input mode as the current language input mode. Here, even though each of 'as' and 'asm' has the English 'completed' mark, priority is given to 'asm' rather than 'as' because 'asm' is comprised of more keystrokes than 'as'.

Thereafter, 's(ㄴ)' is input as a fifteenth keystroke. Then, in operation 601, it is determined whether a combination of the twelfth through fifteenth keystrokes exists in both of the Korean and English automata and whether a combination of the thirteenth through fifteenth keystrokes 'sms(능)' exists in both of the Korean and English automata. Since the combination of the twelfth through fifteenth keystrokes 'asms(ㅁ능)' does not exist in the Korean and English automata but the combination of the thirteenth through fifteenth keystrokes 'sms(능)' only exists in the Korean automata, the Korean input mode is determined as a language input mode of the fifteenth keystroke 's(ㄴ)' in operations 602 and 603. Since the current language input mode is the English input mode and the language input mode of the fifteenth keystroke 's(ㄴ)' is the Korean mode, the keystroke deletion range information and the keystroke conversion range information are set to 2 and 3, respectively, based on the number of keystrokes that have affected the determination of the language input mode of the fifteenth keystroke 's(ㄴ)'. Thereafter, the keystroke deletion range information and the keystroke conversion range information are provided to the keyboard filter driver 113. Then, the keyboard filter driver 113 generates a scan code for deleting a combination of the thirteenth and fourteenth keystrokes 'sm' and a scan code for converting the combination of the thirteenth through fifteenth keystrokes 'sms' into 'ㄴ', provides the scan codes to the keyboard class driver 114, and converts the current language input mode into the Korean input mode.

The above-described automatic language input mode switching function according to embodiments of the present invention may be programmed so that it can display a user interface on a screen when a system operates and can itself be displayed on the screen as a system tray menu. In addition, when a user places a cursor on a predetermined icon corresponding to the automatic language input mode switching function by using a mouse, a general description of the automatic language input mode switching function can be displayed on the screen. Moreover, when the user presses a button on the mouse with the cursor placed on the predetermined icon, a customizable menu can show up on the screen.

Table 2 below shows results of testing recognition rates of automatic language input mode switching functions according to an embodiment of the present invention (gAutoIME), Hunminjeongum (hun), Hangul (hwp), and MS Word (ms word).

TABLE 2

|  | $1^{st}$ Experiment (Chat 1) | $2^{nd}$ Experiment (Chat 2) | $3^{rd}$ Experiment (Culture 1) | $4^{th}$ Experiment (Culture 2) | $5^{th}$ Experiment (Economics 1) | $6^{th}$ Experiment (Economics 2) |
|---|---|---|---|---|---|---|
| gAutoIME | 100.00 | 99.73 | 100.00 | 100.00 | 99.51 | 100.00 |
| hun | 100.00 | 98.74 | 95.34 | 99.02 | 96.79 | 97.12 |

TABLE 2-continued

| | | | | | | |
|---|---|---|---|---|---|---|
| hwp | 100.00 | 99.10 | 100.00 | 100.00 | 99.75 | 99.87 |
| msword | 100.00 | 98.56 | 94.68 | 98.24 | 97.04 | 97.49 |

| | 7th Experiment (Politics 1) | 8th Experiment (Politics 2) | 9th Experiment (Programming 1) | 10th Experiment (Programming 2) | 11th Experiment (Report 1) | 12th Experiment (Report 2) |
|---|---|---|---|---|---|---|
| gAutoIME | 100.00 | 100.00 | 98.5 | 99.64 | 99.20 | 99.40 |
| hun | 99.36 | 98.29 | 76.63 | 95.67 | 96.67 | 95.31 |
| hwp | 99.62 | 99.52 | 99.59 | 100.00 | 99.60 | 99.76 |
| msword | 98.46 | 98.34 | 82.34 | 97.11 | 94.67 | 94.83 |

The first and second experiments were carried out on chat words, the third and fourth experiments on culture-related vocabulary, the fifth and sixth experiments on economics-related vocabulary, the seventh and eighth experiments on politics-related vocabulary, the ninth and tenth experiments on computer programming-related vocabulary, and the eleventh and twelfth experiments on report-tone vocabulary.

As shown in Table 2, the present invention (gAutoIME) has higher recognition rates than Hunminjeongum (hun) and MS Word (ms word) and has almost the same recognition rates as Hangul (hwp).

The invention can be easily applied to various operating systems, such as DOS, UNIX, and LINUX, other than the one set forth herein, i.e., WINDOWS. Moreover, embodiments of the present invention could be used with other types of input, such as keypads on telephones and/or through styluses which input data on touch screen displays such as those used in personal digital assistants (PDAs) and/or tablet PCs.

The invention can be realized as a computer-readable code written on a computer-readable recording medium. The computer-readable recording medium includes nearly all kinds of recording devices, in which data can be stored in a computer-readable manner. For example, the computer-readable recording medium includes ROM, RAM, CD-ROM, a magnetic tape, a floppy disk and an optical data storage. In addition, the computer-readable recording medium can be distributed over a plurality of computer systems connected to one another in a network so that data written thereon can be read by a computer in a decentralized manner. Functional programs, codes, and code segments necessary for realizing the present invention can be easily inferred from the prior art by one of ordinary skill in the art that the present invention pertains to.

As described above, it is possible to recognize in real time a language input mode of each keystroke input to nearly all kinds of devices equipped with an input device, such as a keyboard or keypad and to considerably increase recognition rates by statistically processing the language input mode of each keystroke that may include an error, such as an insertion, deletion, or omission error. In addition, it is possible to dramatically enhance the recognition rates by adaptively recognizing language input modes of words of vocabulary not even registered with dictionaries as well as language input modes of words of vocabulary registered with the dictionaries.

In addition, it is possible to automatically switch at least two language input modes even for application programs that are based on key inputs but do not support an automatic language input mode switching function, based on a result of recognizing the language input mode of each keystroke input to nearly all kinds of devices equipped with a keyboard or keypad, by expanding operating systems of the corresponding devices.

Moreover, it is possible to guarantee high real-time recognition rates for the language input mode of each keystroke and improve the general keystroking environment for users of such devices equipped with a keyboard or keypad as PCs, laptops, mobile phones, portable electronic dictionaries, or PDAs by providing an adaptive recognition of the language input mode of the vocabulary not even registered with the dictionaries and automatically switching at least two language input modes based on the adaptive recognition result.

Furthermore, it is possible to automatically switch a current language input mode into a Hiragana, Katakana, Kanji, or English language input mode for Japanese application programs. The present invention can also be smoothly applied to Japanese application programs, European application programs, and other language application programs once corresponding language electronic dictionaries are manufactured.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of recognizing a language input mode, comprising:
    determining whether a node for a scan code of a current keystroke exists in one of first and second input language automata and recognizing a language input mode of the scan code of the current keystroke; and
    determining whether the node for the scan code of the current keystroke has both a first input language 'completed' mark and a second input language 'completed' mark or both a first input language 'expected' mark and a second input language 'expected' mark when the node for the scan code of the current keystroke is determined as existing in both of the first and second input language automata and recognizing the language input mode of the scan code of the current keystroke.

2. The method of claim 1, further comprising:
    generating keystroke deletion range information deleting at least one previous keystroke that has affected recognition of the language input mode of the current keystroke and generating keystroke conversion range information converting a combination of the at least one previous keystroke and the current keystroke into counterpart keystrokes in another language input mode, respectively, when the recognized language input mode is different from a current language input mode.

3. The method of claim 1, wherein the determining whether the node of the scan code of the current keystroke exists in one of the first and second input language automata comprises:
    determining a first input language mode as the language input mode of the scan code of the current keystroke when the node for the scan code of the current keystroke only exists in the first input language automata;

determining a second input language mode as the language input mode of the scan code of the current keystroke when the node for the scan code of the current keystroke only exists in the second input language automata; and determining a third language input mode corresponding to a previous keystroke as the language input mode of the current keystroke when the node for the scan code of the current keystroke does not exist in either the first or second input language automata.

4. The method of claim 1, wherein the determining whether the node for the scan code of the current keystroke has both the first input language comprises:

determining the first input language mode as the language input mode of the scan code of the current keystroke when the node for the scan code of the current keystroke only includes either the first input language 'completed' mark or the first input language 'expected' mark;

determining the second input language mode as the language input mode of the scan code of the current keystroke when the node for the scan code of the current keystroke only includes either the second input language 'completed' mark or the second input language 'expected' mark; and determining a third language input mode corresponding to a previous keystroke as the language input mode of the current keystroke when the node for the scan code of the current keystroke does not include any of the first input language 'completed' mark, the first input language 'expected' mark, the second input language 'completed' mark, nor the second input language 'expected' mark.

5. The method of claim 1, wherein each of the first and second input language automata is data previously registered with a respective dictionary and data adaptively registered later with the respective dictionaries by a user.

6. The method of claim 1, wherein when recognizing the language input mode of the current keystroke, priority is given to a recognition unit, having a plurality of keystrokes which affect the determining whether the scan code of the current keystroke is in a 'completed' state or in an 'expected' state in the first and second input language automata.

7. The method of claim 6, wherein the recognition unit is a morpheme-like unit.

8. The method of claim 1, wherein priority between a plurality of 'completed' marks or 'expected' marks is given to the 'completed' mark or 'expected' mark having a greatest number of keystrokes.

9. A computer-readable recording medium to be read by a computer, having embodied thereon a computer program for executing a method of recognizing a language input mode performed by the computer, the method comprising:

determining whether a node for a scan code of a current keystroke exists in one of first and second input language automata and recognizing a language input mode of the scan code of the current keystroke; and determining whether the node for the scan code of the current keystroke has both a first input language 'completed' mark and a second input language 'completed' mark or both a first input language 'expected' mark and a second input language 'expected' mark when the node for the scan code of the current keystroke is determined as existing in both of the first and second input language automata and recognizing the language input mode of the scan code of the current keystroke.

10. An apparatus recognizing a language input mode, comprising:

a first input language electronic dictionary, having recognition units of vocabulary of a first input language;

a second input language electronic dictionary, having recognition units of vocabulary of a second input language;

a user language electronic dictionary, having user vocabulary obtained from keystrokes that are manually deleted or converted by a user or combinations thereof; and an adaptive recognizer to recognize a language input mode of a scan code of each keystroke by referring to each of the first and second input language electronic dictionaries and the user language electronic dictionary and output a current language input mode, the recognized language input mode of the scan code of each keystroke, keystroke deletion range information, and keystroke conversion range information.

11. The apparatus of claim 10, wherein each of the first and second input language electronic dictionaries and the user language electronic dictionaries has a finite-state automata structure.

12. A method of automatically switching language input modes, comprising:

generating a control signal to determine whether to turn on an automatic language input mode switching function;

bypassing a current keystroke input that is inputted via a predetermined input device when the control signal is an off signal;

bypassing the current keystroke, or deleting one or more previous keystrokes and converting the one or more previous keystrokes and the current keystroke into respective counterparts in another language input mode according to a result of recognizing a language input mode of a scan code of the current keystroke when the control signal is an on signal; and recognizing the language input mode of the scan code of the current keystroke by referring to each of first and second input language electronic dictionaries and a user language electronic dictionary, and providing a current language input mode, the recognized language input mode of the current keystroke, keystroke deletion range information, and keystroke conversion range information.

13. The method of claim 12, further comprising:

performing in a kernel module of a predetermined operating system each of the generating the control signal to determine whether to turn on the automatic language input mode switching function; bypassing the current keystroke input that is inputted via the predetermined input device when the control signal is the off signal; and bypassing the current keystroke, or forcefully deleting one or more previous keystrokes and converting the previous keystroke(s) and the current keystroke into their respective counterparts in another language input mode according to the result of recognizing the language input mode of the scan code of the current keystroke when the control signal is the on signal.

14. The method of claim 12, further comprising:

performing in a kernel module of a predetermined operating system each of the generating the control signal to determine whether to turn on the automatic language input mode switching function; bypassing the current keystroke input that is inputted via the predetermined input device when the control signal is the off signal; and bypassing the current keystroke, or forcefully deleting one or more previous keystrokes and converting the previous keystroke(s) and the current keystroke into their respective counterparts in another language input mode according to the result of recognizing the language input mode of the scan code of the current keystroke when the control signal is the on signal; and performing in a user module the recognizing the language input mode of the scan code of the current keystroke by referring to each of the first and second input language electronic dictionaries and the user language electronic dictionary, and providing the current language input mode, the recognized language input mode of the current keystroke, keystroke deletion range information, and keystroke conversion range information.

15. The method of claim 12, wherein each of the first and second input language electronic dictionaries and the user language electronic dictionary each has a finite-state automata structure.

16. The method of claim 12, wherein the recognition of the language input mode is performed on a morpheme-like unit basis.

17. A method of automatically switching language input modes, comprising:
generating a control signal to determine whether to turn on an automatic language input mode switching function;
bypassing a current keystroke input that is inputted via a predetermined input device when the control signal is an off signal; and
bypassing the current keystroke, or deleting one or more previous keystrokes and converting the one or more previous keystrokes and the current keystroke into respective counterparts in another language input mode according to a result of recognizing a language input mode of a scan code of the current keystroke when the control signal is an on signal,
wherein the control signal comprises
a prior control signal, which is generated through a user interface so that a user is allowed to determine whether to turn on the automatic language input mode switching function when a system operates; and
a posterior control signal, which is generated according to whether a window that the user is currently working on needs the automatic language input mode switching function by monitoring which window the user is currently working on.

18. A computer-readable recording medium, having embodied thereon a computer program for executing a method of automatically switching language input modes performed by a computer, the method comprising:
generating a control signal that determines whether to turn on an automatic language input mode switching function;
bypassing a current keystroke input that is inputted via a predetermined input device when the control signal is an off signal;
bypassing the current keystroke, or deleting one or more previous keystrokes and converting the previous keystroke(s) and the current keystroke into their respective counterparts in another language input mode, according to a result of recognizing a language input mode of a scan code of the current keystroke when the control signal is an on signal; and
recognizing the language input mode of the scan code of the current keystroke by referring to each of first and second input language electronic dictionaries and a user language electronic dictionary, and providing a current language input mode, the recognized language input mode of the current keystroke, keystroke deletion range information, and keystroke conversion range information.

19. An apparatus for automatically switching language input modes, comprising:
a first unit which generates a control signal that determines whether to turn on an automatic language input mode switching function;
a second unit which bypasses a current keystroke input via a predetermined input device when the control signal is an off signal, the second unit either bypasses the current keystroke or deletes one or more previous keystrokes and converts the one or more previous keystrokes and the current keystroke into respective counterparts in another language input mode according to a result of recognizing a language input mode of a scan code of the current keystroke when the control signal is an on signal; and
a third unit which recognizes the language input mode of the scan code of the current keystroke by referring to each of first and second input language electronic dictionaries and a user language electronic dictionary, and provides a current language input mode, the recognized language input mode of the current keystroke, keystroke deletion range information, and keystroke conversion range information to the second unit.

20. The apparatus of claim 19, wherein each of the first unit, the second unit and the through third unit is a kernel module of a predetermined operating system.

21. The apparatus of claim 19, wherein each of the first and second units is a kernel module of a predetermined operating system, and the third unit is a user module of the predetermined operating system.

22. The apparatus of claim 19, wherein the control signal comprises a prior control signal, which is generated through a user interface to allow a user to determine whether to turn on the automatic language input mode switching function when a system operates, and a posterior control signal, which is generated depending on whether a window that the user is currently working on needs the automatic language input mode switching function by monitoring which window the user is currently working on.

23. The apparatus of claim 19, wherein each of the first and second input language electronic dictionaries are finite-state automata registered in advance and/or finite-state automata adaptively registered later by the user.

24. The apparatus of claim 19, wherein the third unit recognizes a language input mode of each stroke on a morpheme-like unit basis.

25. An automatic language processing system determining a language from datum entered by an input device into a computer, comprising:
a scanner scanning the datum and outputting a control signal determining when the datum requires language processing;
a driver performing one of a deletion of previous datum, a conversion of the datum and the previous datum into another language, and bypassing the datum, according to a language input mode and/or the control signal; and
a language recognizer determining whether a node for a scan code of a current keystroke exists in one of first and second input language automata and recognizing a language input mode of the scan code of the current keystroke, and determining whether the node for the scan code of the current keystroke has both a first input language 'completed' mark and a second input language 'completed' mark or both a first input language 'expected' mark and a second input language 'expected' mark when the node for the scan code of the current keystroke is determined as existing in both of the first and second input language automata and recognizing the language input mode of the scan code of the current keystroke.

26. The system of claim 25, wherein the language recognizer determines the language input mode of the datum according to each morpheme unit in the language dictionaries. structure.

27. The system of claim 25, wherein at least one of the language dictionaries is an Asian language comprising the group of Korean, Chinese and Japanese language.

28. The system of claim 25, wherein the language dictionaries comprise at least two of Hiragana, Katakana, Kanji, English, and a user defined dictionary.

29. The system of claim 25, wherein the system is included in the computer which is one of a computer, laptop, mobile phone, portable electronic dictionary, or personal digital assistant.

30. The system of claim 25, further comprising an adaptive recognizer to adaptively recognize the language input mode of a current keystroke by referring to the language dictionaries.

31. The system of claim 30, wherein the adaptive recognizer further monitors datum that is deleted after being automatically converted into the other language and registers the datum with a user language dictionary, such that the datum in the user language dictionary is registered in a vocabulary decision tree structure obtained using a finite-state automata.

32. The system of claim 31, wherein the user language dictionary is integrated with the language dictionaries.

33. The system of claim 25, further comprising a display which displays in real time the bypassed datum and/or the converted datum.

34. The system of claim 33, wherein the language dictionaries are implemented as a vocabulary decision tree comprising a finite state automata structure.

35. A method of automatically determining a language from datum entered by an input device into a computer and converting the entered datum into a desired language, comprising:

scanning the datum and outputting a control signal determining when the datum requires language processing;

performing one of a deletion of previous text, a conversion of the datum and the previous text into another language, and bypassing the datum, according to a language input mode and/or the control signal; and determining whether a node for a scan code of a current keystroke exists in one of first and second input language automata and recognizing a language input mode of the scan code of the current keystroke, and determining whether the node for the scan code of the current keystroke has both a first input language 'completed' mark and a second input language 'completed' mark or both a first input language 'expected' mark and a second input language 'expected' mark when the node for the scan code of the current keystroke is determined as existing in both of the first and second input language automata and recognizing the language input mode of the scan code of the current keystroke.

36. The method of automatically determining a language of claim 35, further comprising determining the language input mode of the datum according to each morpheme unit in the language dictionaries.

37. The method of automatically determining a language of claim 36, wherein the language dictionaries are implemented as a vocabulary decision tree comprising a finite state automata structure.

38. The method of automatically determining a language of claim 35, further comprising registering datum not located in the language dictionaries with each of the language dictionaries thereby increasing a recognition rate for automatically switching language input modes.

39. The method of automatically determining a language of claim 35, further comprising displaying in real time the bypassed datum and/or the converted datum.

* * * * *

UNITED STATES PATENT AND TRADEMARK OFFICE
CERTIFICATE OF CORRECTION

| | | |
|---|---|---|
| PATENT NO. | : 7,562,007 B2 | Page 1 of 1 |
| APPLICATION NO. | : 10/867791 | |
| DATED | : July 14, 2009 | |
| INVENTOR(S) | : Kwang-Il Hwang | |

It is certified that error appears in the above-identified patent and that said Letters Patent is hereby corrected as shown below:

On the title page, item [75] (Inventor), Line 1, change "Kwang-ll" to --Kwang-Il--.

Column 21, Line 4, after "dictionaries." delete "structure.".

Signed and Sealed this

Tenth Day of November, 2009

David J. Kappos
*Director of the United States Patent and Trademark Office*